Patented Mar. 26, 1929.

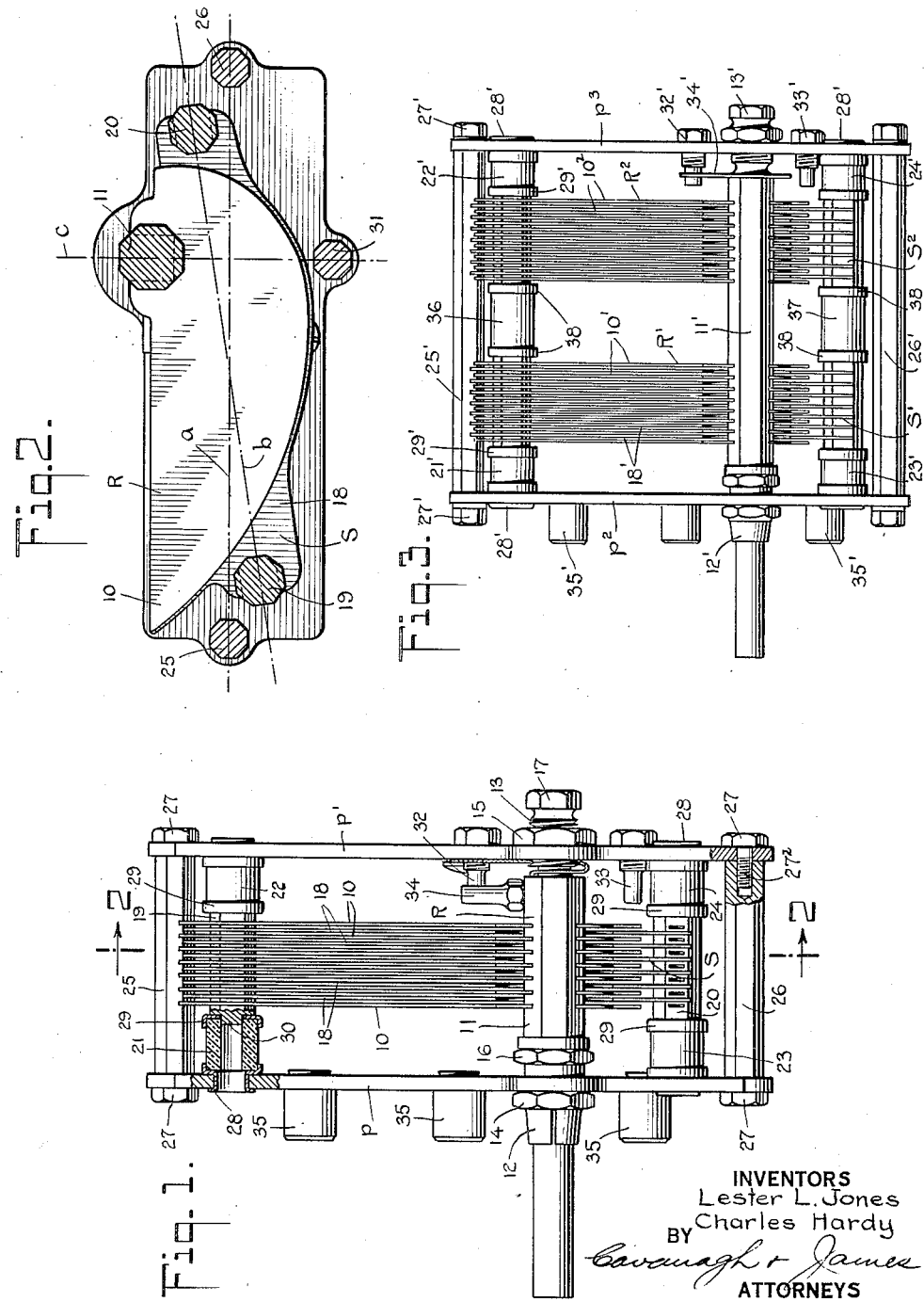

1,706,735

UNITED STATES PATENT OFFICE.

LESTER L. JONES, OF ORADELL, NEW JERSEY, AND CHARLES HARDY, OF NEW YORK, N. Y., ASSIGNORS TO AMSCO PRODUCTS INC., OF NEW YORK, N. Y., A CORPORATION OF NEW YORK.

VARIABLE AIR CONDENSER.

Application filed September 10, 1925. Serial No. 55,426.

This invention relates to electrical condensers, and more particularly to variable air condensers; and has special reference to the provision of an improved variable air condenser of the rotor and stator type.

The prime desideratum of our present invention comprehends the provision of an improved variable air condenser particularly of the so-called "low loss" type, in which the parts are organized and coordinatingly supported to produce a balanced, rugged and stable structure capable of being rapidly assembled in quantities with precision and with uniform results.

In condensers of the type referred to, one or more stator plate sets is or are insulatably carried by end plates supporting and conductively integral with one or more rotor plate sets, the said plate sets being provided with interleaving condenser plates. In the manufacture of efficient precision and durable condensers of this type, a number of inter-related problems present themselves for solution. The stator and rotor plates are interleaved with small clearances therebetween, and in order to permit not only facile and rapid assembly of the parts in uniformly and accurately spaced relation, but in order to stably and durably maintain the parts in use in their assembled positions, the stator and rotor plate sets should desirably be supported at a minimum number of mutually assisting points of support with the supporting thrusts and stresses appropriately balanced. By providing a minimum number of supporting points, the assembling operations may be more readily standardized and carried out with greater ease, and the distribution of supporting forces which should be balanced to maintain the parts in stable positions may be more readily and accurately predetermined. The provision of a variable air condenser in which the parts are organized and coordinated in this manner to produce a balanced and stable assembly subject to ease and rapidity of manufacturing and assembling operations, is one of the principal objects of our present invention.

To produce a condenser of low loss and consequent high efficiency, it is also essential to reduce to a minimum the amount or volume of the absorption dielectrics in the form of insulating supports, and to so dispose the conducting masses as to produce a weak electrostatic field in the region of the insulating supports. In order, however, to firmly and ruggedly support the plate sets one with respect to the other, and in order to provide definite supporting stresses so that they may be balanced, it is desirable to arrange the insulating supports to take up and efficiently withstand the supporting thrusts and to provide definite directions for the supporting stresses. A further principal object of the present invention therefore comprehends the provision of a condenser of the low-loss type in which the insulating supports are disposed so as to produce a weak electrostatic field while arranged so that the maximum strength of the insulating material is utilized for sustaining the supporting forces with the forces active in a predetermined way.

To the accomplishment of the foregoing and such other objects as will hereinafter appear, our invention consists in the elements and their relation one to the other, as hereinafter particularly described and sought to be defined in the claims; reference being had to the accompanying drawings which show the preferred embodiments of our invention, and in which:

Fig. 1 is a top plan view of the improved variable air condenser of our present invention with parts broken away, Fig. 2 is a view of the same taken in cross-section in the plane of the line 2—2, Fig. 1, and depicting the distribution and balancing of the supporting forces, and Fig. 3 is a top plan view of a modification.

Referring now more in detail to the drawings, and more particularly to Figs. 1 and 2 thereof, the improved variable air condenser comprises a movable plate or rotor unit R carried by and journalled in the opposite metallic end supporting plates $p$ and $p'$ and a stationary plate or stator unit S insulatably supported on the end plates $p$ and $p'$.

The rotor unit R comprises a plurality of spaced plates 10, 10 fixed to a rotor shaft 11 which is journalled in opposite end bearings in the form of bushings 12 and 13 threadedly received by the metallic end plates $p$ and $p'$, the bushings being threadedly adjustable in the end plates for adjusting the position of the rotor plates and being locked in position by means of the nuts 14 and 15 threadedly received by the bushings and engaging the opposite walls of the end plates as clearly shown in the drawings. For facilitating the rotating adjustment of the bushings 12 and 13 in the end plates, the bushings 12 and 13 are provided with the gripping heads 16 and 17 respectively.

The stator unit S comprises a plurality of plates 18, 18 arranged to interleave with the rotor plates 10, 10 in a manner well known in the art, and the said stator plates are secured to and supported by a pair of supporting posts 19 and 20, the said posts being insulatably mounted between and arranged to bear in opposite directions on the end supporting plates p and p', a plurality of insulating members 21, 22, 23 and 24, four in number, being provided for this purpose, the insulating members and supporting posts having interlocking means which inter-engage in the assembling of the parts for holding the stator in supported position, as will be described more in detail hereinafter. The stator plates 18, as well as the rotor plates 10, may be contoured as desired, and in the construction exemplified in the drawings, these plates are contoured to yield a straight line frequency calibration curve.

As heretofore stated, one of the prime desiderata of the present invention centers about the provision of an improved variable air condenser in which the stator and rotor plate sets are co-ordinated to produce a balanced and stable structure capable of being rapidly, uniformly and accurately assembled, and in which more specifically, in order to permit not only the facile and rapid assembly of the parts, but to stably and durably maintain the same in use in their assembled positions, the stator and rotor plate sets are supported at a minimum number of mutually assisting points of support, with the supporting thrusts and stresses appropriately balanced.

To accomplish this object of the invention, we provide a construction in which the end plates p and p' are interconnected at a minimum number of points lying in a longitudinal plane a (Fig. 2) which intersects a longitudinal plane b embracing the supporting means for the stator S, the construction and arrangement being such that the connecting means for the end plates constitutes the sole means for locking the condenser parts in assembled relation, and such that the stator supporting means cooperates therewith for holding the parts in balanced condition. To accomplish the desired ends, the connecting plates p and p' are connected in spaced relation by a pair of connecting members or posts 25 and 26 arranged at opposite sides of the condenser assembly, the said connecting posts lying in the longitudinal plane a intersecting the plane b preferably at an acute angle, the said posts being secured to the end plates p and p' at their opposite ends by means of the bolts 27 having the threaded shanks 27' received in correspondingly tapped bores in the ends of the posts, as clearly shown in Fig. 1 of the drawings.

The stator supporting posts 19 and 20 are moreover so carried on the end supporting plates p and p', through the intermediation of the supporting elements or members 21—24, that the supporting stresses or forces for the stator all lie in the plane b exerted in opposite directions upon the end plates p and p'.

By means of this coordination and relative arrangement of the supporting parts, it will be seen that the pair of posts 25 and 26 constitute the sole means for holding the rotor and stator in secured relation, and that the supporting means for the stator cooperates with the connecting posts so as to provide balanced forces for holding the stator and rotor parts in mutually assembled relation. It will be further evident that the assembling position for the stator may be readily and accurately predetermined because a minimum number of supports are provided for the same which lie in a single plane; and that correspondingly the assembly positioning of the end plates and the rotor may be also predetermined with precision by reason of the provision of a minimum number of connecting members for the end plates which also lie in a single plane. It will further be appreciated that the assembling operations are facilitated, because it is only requisite to interlock or interconnect the various parts, such for example as the stator on the end plates or the end plates on the supporting posts, at a minimum number of engaging points. Thus the assembling operations may be readily standardized and carried out with great ease, especially with the use of quantity production methods, thereby permitting the employment of unskilled help to produce a precision instrument which is rugged, durable and stable in use.

To produce a condenser of low loss and consequent high efficiency, it is a further principal object of the invention, as heretofore stated, to provide a condenser in which the insulating supports for the stator are disposed so as to produce a weak electrostatic field; and in order to firmly and ruggedly support the plate sets one with respect to the other and to provide definite supporting balancing stresses, the insulating supports are arranged so that the maximum strength of the insulating material is utilized for sustaining the supporting forces in a predetermined way. Moreover, to assist in facilitating the rapid assembling of the parts, the stator and insulating supports therefor are provided with means which interlock as the parts are assembled, this eliminating the necessity of utilizing securing elements.

To these ends, the insulating elements 21—24 each comprises a short tubular member, one end of which is seated in a cup-shaped element 28 riveted in the end plate, and the other end of which is provided with a flanged end cap 29 centrally apertured to receive a stud portion 30 (see Fig. 1) integral with the stator supporting post such as 19, so that the stator may be mounted during assembly on the insulating pieces to interlock with the same without the use or employment of securing elements. By the elimination of securing elements, moreover, the amount of dielectric material used for the insulating members may be considerably reduced, thereby weakening the electrostatic field in the region of the insulating supports. It will be further seen from the construction provided that the disposition of the insulating members 21—24 is such that the maximum strength thereof is utilized for sustaining the supporting forces, all of which lie in the predetermined longitudinal plane $b$.

It is desirable to adjust the rotor plate set with sufficient friction between the same and the adjustable bushings 12 and 13 so that the rotor is frictionally held in any adjusted position, and to balance the thrusts exerted by the rotor shaft 11 on the end plates $p$ and $p'$ under these conditions, we prefer to provide a third connecting post 31 secured at its opposite ends to the end supporting plates and arranged in a plane $c$ (Fig. 2), the said connecting post and the rotor shaft 11 being preferably arranged on opposite sides of the planes $a$ and $b$. For limiting the rotation of the rotor R to substantially 180°, the end supporting plate $p'$ is provided with stop elements 32 and 33 which cooperate with a stop pin 34 fixed to the rotor shaft 11. For mounting the condenser assembly on a suitable support such as a panel, the end supporting plate $p$ is provided with the plurality of supporting members 35, 35, each of which may be riveted to the end plate $b$.

In the modification shown in Fig. 3 of the drawings, the principles of the invention are shown applied to the construction of multiple unit condensers embodying for example two (or more) stator plate sets insulated from each other cooperating with a like number of rotor plate sets. In this multiple unit construction, the rotor comprises the rotor plate sets R' and R² carried by the shaft 11' which is journalled in the bushings 12' and 13' adjustable in the end plates $p^2$ and $p^3$, and the stator comprises the stator plate sets S' and S² insulatably carried on the end plates by the insulating members 21'—24' in a manner similar to that heretofore described for Figs. 1 and 2 of the drawings, and insulated from each other by the provision of a pair of tubular insulating members 36 and 37 each provided with the end caps 38 at its opposite ends having a construction similar to that of the end caps 29. The remaining parts of the construction shown in Fig. 3 are similar to that shown in Figs. 1 and 2, and are designated by similar and primed reference characters. It may be noted that the insulating members 21'—24' and the insulating members 36 and 37 all lie in a single plane corresponding to the plane $b$ shown in Fig. 2, which plane intersects a plane embracing the connecting posts 25' and 26' corresponding to the plane $a$ of Fig. 2.

The manner of making, assembling and using the condenser embodying the principles of our invention and the many advantages thereof, will in the main be fully apparent from the above detailed description thereof. It will be apparent that while we have shown and described our invention in the preferred forms, that many changes and modifications may be made in the structure disclosed without departing from the spirit of the invention, defined in the following claims.

We claim:

1. A variable air condenser comprising a rotor plate set, end supporting plates carrying the rotor plate set, a pair of posts connecting the end supporting plates for rigidly holding the same in spaced relation, a stator plate set, means supporting the stator plate set on the end supporting plates consisting of a plurality of insulating pieces carried by the end plates and carrying the stator plate set, the insulating pieces and the stator plate set being provided with interlocking inter-engaging means effective for locking the stator plate set in supported position when the parts are assembled, the said insulating pieces lying in a longitudinal plane intersecting a longitudinal plane embracing the connecting pair of posts, the construction being such that the said pair of posts constitutes the sole means for rigidly locking the condenser parts in assembled relation and such that the stator supporting means cooperates with the pair of posts for holding the parts in balanced and fixed relation.

2. A variable air condenser comprising end supporting plates, a rotor plate set having a shaft journalled in and arranged to bear in opposite directions on the end supporting plates, a pair of posts connecting the end supporting plates for rigidly holding the same in spaced relation, a stator plate set, means supporting the stator plate set on the end supporting plates consisting of a pair of posts and a plurality of insulating pieces carried by the end plates and carrying the said stator posts, the insulating pieces and the stator posts being provided with interlocking inter-engaging means effective for locking the stator plate set in supported position when the parts are assembled, the said stator posts lying in a longitudinal plane intersecting a longitudinal plane which embraces the connecting pair of posts, the construction being such that the said pair of posts constitutes the sole means for rigidly locking the condenser parts in assembled relation and the stator supporting means cooperates with the pair of posts for holding the parts in balanced and fixed relation, and a third connecting post connecting the end plates and arranged to balance the thrust exerted by the rotor shaft on the end plates.

3. A variable air condenser comprising metallic end supporting plates, a rotor plate set journalled in the end supporting plates, a stator plate set and means supporting the stator plate set on said end supporting plates, said means consisting of cup shaped elements riveted to the end plates, insulating members seated in the cup shaped elements, apertured end caps on the insulating members and posts on the stator plate sets provided with studs interlocking with the apertures in the end caps.

4. A variable air condenser comprising metallic end supporting plates, a rotor plate set journalled in the end supporting plates, a stator plate set and means supporting the stator plate set on said end supporting plates, said means consisting of cup shaped elements riveted to the end plates, tubular insulating members seated in the cup shaped elements, apertured flanged end caps on the insulating members and posts on the stator plate sets provided with studs interlocking with the apertures in the end caps.

5. A variable condenser comprising a rotor plate set, metallic end supporting plates carrying the rotor plate set, a pair of posts connecting the end supporting plates for holding the same in spaced relation, a plurality of stator plate sets, means supporting the stator plate sets on the end plates insulated from each other and from the end plates, said means consisting of a pair of posts carrying each stator plate set, insulating members arranged between the posts of the stator plate sets and insulating members arranged between the end supporting plates and the adjacent ends of the said stator posts, the said insulating members and stator posts being provided with interlocking inter-engaging means effective for locking the stator plate sets in supported position as the parts are assembled, all of said stator posts lying in a longitudinal plane intersecting a longitudinal plane embracing the connecting pair of posts, the construction being such that the pair of connecting posts constitutes the sole means for locking the condenser parts in assembled relation and such that the stator posts cooperate with the connecting posts for holding the parts in balanced relation.

Signed at New York city, in the county of New York and State of New York, this 31st day of August, A. D., 1925.

LESTER L. JONES.
CHARLES HARDY.